(12) United States Patent
Moetakef et al.

(10) Patent No.: US 10,634,231 B2
(45) Date of Patent: Apr. 28, 2020

(54) GEARS WITH VARYING PRESSURE ANGLE

(71) Applicant: Ford Global Technologies, LLC, Dearborn, MI (US)

(72) Inventors: Mohammad Ali Moetakef, West Bloomfield, MI (US); Abdelkrim Zouani, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1045 days.

(21) Appl. No.: 15/132,761

(22) Filed: Apr. 19, 2016

(65) Prior Publication Data
US 2017/0299039 A1 Oct. 19, 2017

(51) Int. Cl.
*F16H 55/16* (2006.01)
*F16H 55/08* (2006.01)
*F16H 1/06* (2006.01)

(52) U.S. Cl.
CPC .............. *F16H 55/16* (2013.01); *F16H 1/06* (2013.01); *F16H 55/08* (2013.01)

(58) Field of Classification Search
CPC ................................. F16H 55/08; F16H 55/16
USPC .................................................... 74/443, 462
See application file for complete search history.

(56) References Cited

U.S. PATENT DOCUMENTS

| | | | | |
|---|---|---|---|---|
| 841,425 A | * | 1/1907 | Nelson | 418/119 |
| 2,307,651 A | * | 1/1943 | Waldman | B23F 1/02 |
| | | | | 451/47 |
| 2,506,756 A | * | 5/1950 | Wildhaber | F16H 55/0853 |
| | | | | 74/459.5 |
| 2,585,971 A | * | 2/1952 | Sloane | F16H 1/04 |
| | | | | 74/393 |
| 3,237,469 A | * | 3/1966 | Berry | F01L 1/02 |
| | | | | 474/150 |
| 3,329,037 A | * | 7/1967 | Stott | F16H 1/06 |
| | | | | 74/437 |
| 3,817,117 A | * | 6/1974 | Kita | F04C 2/084 |
| | | | | 74/462 |
| 4,444,070 A | * | 4/1984 | Yanai | B62D 3/123 |
| | | | | 74/422 |
| 4,939,953 A | * | 7/1990 | Yasui | F16H 48/08 |
| | | | | 475/233 |
| 6,164,944 A | * | 12/2000 | Martin | F04C 2/084 |
| | | | | 418/171 |

(Continued)

FOREIGN PATENT DOCUMENTS

| CN | 101285520 B | 11/2010 |
|---|---|---|
| CN | 201786648 U | 4/2011 |

(Continued)

*Primary Examiner* — William C Joyce
(74) *Attorney, Agent, or Firm* — Diana D. Brehob, Brehob Law PLLC; Gregory P. Brown; Geoffrey G. Brumbaugh

(57) ABSTRACT

Gears are known to have a whine that can be unpleasant to operators or occupants of vehicles. A gear set is disclosed in which the pressure angle of the teeth varies along the periphery of the gear. A mating gear also has teeth with varying pressure angle. The teeth that mate have an identical pressure angle so that present disclosure is applicable only to 1:1 or integer ratio gears: 2:1, 3:1, etc. Because the teeth meet differently as a function of the pressure angle, the fundamental vibration frequency is not reinforced as would be the case with all teeth having the same pressure angle.

18 Claims, 2 Drawing Sheets

(56) References Cited

U.S. PATENT DOCUMENTS

| | | | | |
|---|---|---|---|---|
| 8,225,690 B2 * | 7/2012 | Shimada | ............... | F16H 1/20 74/443 |
| 2007/0207051 A1 * | 9/2007 | Katz | ............... | F16H 55/08 418/206.1 |
| 2017/0183061 A1 * | 6/2017 | Yamamoto | ............. | B62M 11/18 |

FOREIGN PATENT DOCUMENTS

| | | | |
|---|---|---|---|
| CN | 201851630 U | | 6/2011 |
| CN | 103807408 B | | 3/2016 |
| GB | 2 224 554 | * | 9/1990 |
| JP | 63180766 | | 7/1988 |

\* cited by examiner

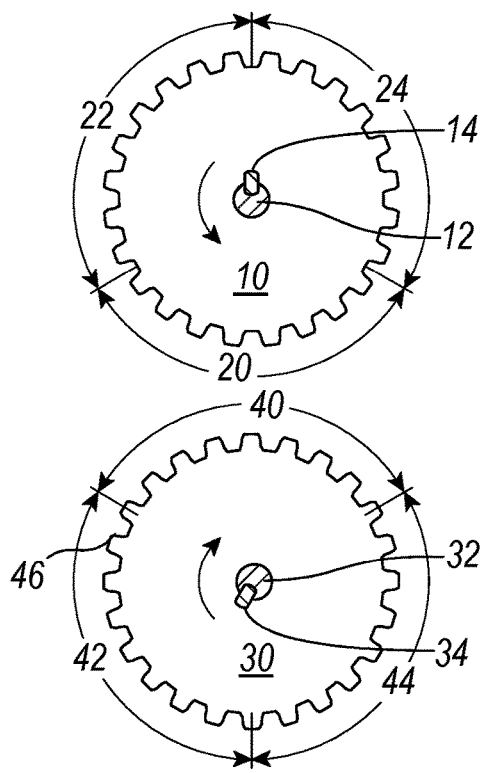
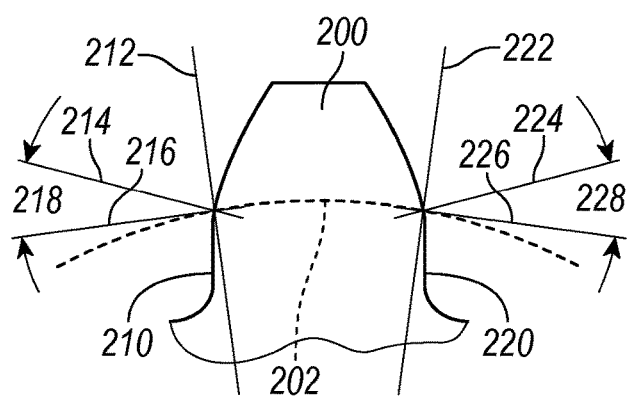
Fig. 2
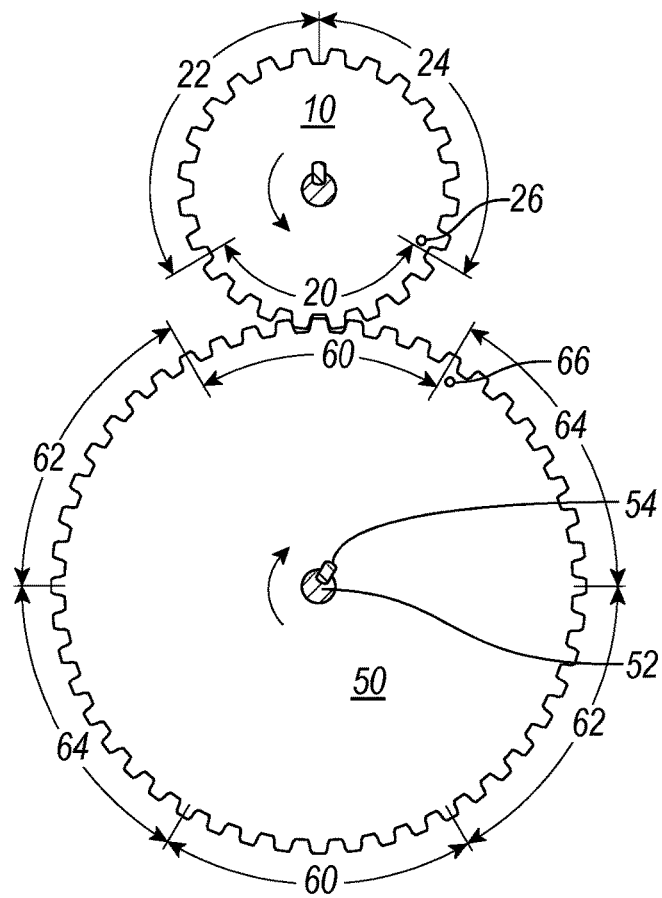
Fig. 1
Fig. 3

GEARS WITH VARYING PRESSURE ANGLE

FIELD

The present disclosure relates to gear pairs that have varying pressure angle among teeth on a single gear.

BACKGROUND

Gear noise is a common issue for which solutions have been sought for decades. Rattle is prevalent when meshing teeth impact each other due to separation between the teeth. Rattle can be reduces by minimizing teeth backlash. In operation, the contact forces lead to vibrations in the gear pair due to the frequencies of teeth meshing. When tooth backlash is minimized, whine increases. A fundamental frequency develops and reinforced by each tooth engagement during rotation of the mating gears. One solution is to use a scissor-type gear, in which one of the gear pair has two gears with the same number of teeth, but with the teeth offset from each other slightly by spring loading. The backlash is taken up by the teeth of the spring-loaded gears. However, this doesn't address the whine issue. Furthermore, such a solution introduces complications and additional parts. An inexpensive solution to address gear whine, particularly for applications, such as automotive, where the noise is perceived by a nearby individual is desired.

SUMMARY

A crankshaft that reduces the fundamental frequency of vibration by introducing other frequencies presents an improvement over the prior art. One disclosed embodiment has a gear set with a first gear having a first portion of teeth having a first pressure angle and a second portion of teeth having a second pressure angle; and a second gear having a first portion of teeth having the first pressure angle and a second portion of teeth having the second pressure angle. The first portion of first gear teeth mesh with the first portion of second gear teeth. The second portion of first gear teeth mesh with the second portion of second gear teeth.

Some embodiments further include a third portion of teeth on the first gear having a third pressure angle and a third portion of teeth on the second gear having the third pressure angle.

In some cases, total number of teeth on the first gear equals total number of teeth on the second gear; a number of teeth in the first portion of teeth of the first gear is one greater than number of teeth in the first portion of the second gear; and the second gear has a transition tooth in which the pressure angle on a first side of the tooth is the first pressure angle and the pressure angle on a second side of the tooth is the second pressure angle. In other embodiments, total number of teeth on the first gear divided by total number of teeth on the second gear yields a quotient of one of: two, three, four, five, one-half, one-third, one-quarter, and one-fifth; number of teeth in the first portion of the first gear equals the quotient times the number of teeth of the second gear; when the quotient is greater than one, the first portion of teeth on the first gear is separated into evenly-spaced regions with the number of regions equal to the quotient; and when the quotient is less than one, the first portion of teeth on the second gear is separated into evenly-spaced regions with the number of regions equal to the reciprocal of the quotient. When the quotient is greater than one, the first portion of teeth on the second gear are mutually adjacent; and when the quotient is less than one, the first portion of teeth on the first gear are mutually adjacent.

In some embodiments, the first portion of teeth of the first gear are arranged randomly on the periphery of the first gear; and the first portion of teeth of the second gear are arranged so that the first portion of teeth of the second gear mesh with the first portion of the teeth of the first gear when the gears are rotated.

And in other embodiments, the first portion of teeth of the first gear are evenly arranged on the periphery of the first gear; the second portion of teeth of the first gear are evenly arranged on the periphery of the first gear; the first portion of teeth of the second gear are arranged so that the first portion of teeth of the second gear mesh with the first portion of the teeth of the first gear when the gears are rotated; and the second portion of teeth of the second gear are arranged so that the second portion of teeth of the second gear mesh with the second portion of the teeth of the first gear when the gears are rotated.

A first shaft, a second shaft arranged in parallel with the first shaft, a first index on the first gear, and a second index on the second gear may also be included. The first gear is mounted on the first shaft. The second gear is mounted on the second shaft. The first and second index are lined up when the driving and second gears are enmeshed.

Also disclosed in a gear set having a first gear in which teeth in a first sector have a first pressure angle and teeth in a second sector have a second pressure angle and a second gear in which teeth in a third sector have the first pressure angle and teeth in a fourth sector have the second pressure angle wherein the first and second gears are enmeshed. The first pressure angle does not equal the second pressure angle.

In some embodiments, the first gear further includes a fifth sector in which the teeth have a third pressure angle and the second gear further includes a sixth sector in which the teeth have the third pressure angle.

The teeth of the first gear and the second gear that sit on an overlap between the two sectors are transition teeth in which the pressure angle on one side of the tooth differs from the pressure angle on the other side of the tooth.

The number of whole teeth in the first sector of the first gear is within one of the number of whole teeth in the third sector of the second gear.

In some cases, the second gear is twice the diameter of the first gear. The second gear further comprises a fifth sector in which the teeth have the first pressure angle. The second gear further comprises a sixth sector in which the teeth have the second pressure angle. The fifth sector is located between the third and fourth sectors. When the gears rotate, the teeth of the first sector mesh with the teeth of the third and fifth sectors. The teeth of the second sector mesh with the teeth of the fourth and sixth sectors.

The gear set may further include: a first shaft and a second shaft arranged in parallel with the first shaft. The first shaft is inserted into a centrally-defined opening on the first gear. The second shaft is inserted into a centrally-defined opening on the second gear.

The first shaft, the second shaft, the centrally-defined opening on the first gear, and the centrally-defined opening on the second gear each have a keyway, in some embodiments. A first key is inserted into the keyways of the first shaft and the keyway on the first gear; and a second key is inserted into the keyways of the second shaft the keyway on the second gear.

Also disclosed is a method to manufacture a gear set that includes machining a first gear having a first plurality of gear teeth having a first pressure angle and a second plurality of gear teeth having a second pressure angle and machining a second gear having a first plurality of gear teeth having the first pressure angle, a second plurality of gear teeth having the second pressure angle, and at least one transition tooth with the first pressure angle on one side and the second pressure angle on the second side.

The method may also include machining a third plurality of teeth on the first gear with a third pressure angle, machining a third plurality of teeth on the second gear with a third pressure angle, and machining a transition tooth on one of the first and second gears where ever a change in pressure angle occurs. A transition tooth is one that has one pressure angle on one side of the tooth and another pressure angle on the other side of the tooth.

The first plurality of gear teeth in the first gear engage with the first plurality of gear teeth in the second gear when the gears rotate; and the second plurality of gear teeth in the second gear engage with the second plurality of gear teeth in the second gear when the gears rotate.

By providing a varying pressure angle around the periphery of the gear, the fundamental frequency changes and thus is not reinforced by all of the gear teeth. The total sound level may be similar to a gear set in which all the teeth have the same pressure angle, but having the frequencies spread out makes the noise less annoying to humans.

BRIEF DESCRIPTION OF THE DRAWINGS

FIG. 1 shows two separated gears;
FIG. 2 shows a detail of a single tooth of a gear defining parameters relevant to the present disclosure;
FIG. 3 shows two gears with enmeshed teeth.

DETAILED DESCRIPTION

Figure 4:
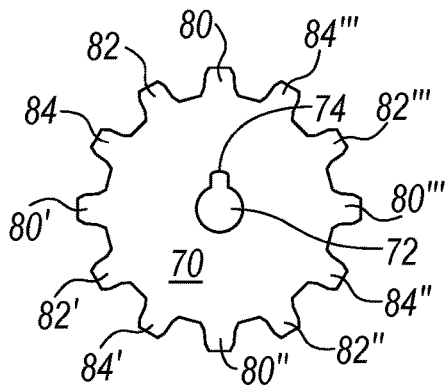
FIGS. 4-6 show single gears with teeth having varying pressure angles.

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations. Those of ordinary skill in the art may recognize similar applications or implementations whether or not explicitly described or illustrated.

A pair of gears 10 and 30 are shown in FIG. 1. Driving gear 10 and driven gear 30 are shown separated. Driving gear 10 is mounted on a shaft 12, shown in cross section, using a key 14 wedged into a keyway in gear 10 and a keyway in shaft 12. Gear 10, by way of non-limiting example, has 24 teeth. In a first sector 22 of gear 10, the teeth have a first pressure angle. In a second sector 24 of gear 10, the teeth have a second pressure angle, the second pressure angle being different than the first pressure angle. In a third sector 24 of gear 10, the teeth have a third pressure angle. The example in FIG. 1 shows eight teeth in each of the first, second, and third sectors, 20, 22, and 24, respectively, i.e., sectors 20, 22, and 24 are identical in size. Alternatively, the sectors are non-uniform in size. In another alternative, a different number of sectors is used: 2, 4, 5, as examples. Particularly when the number of teeth is not divisible by the number of sectors must the sectors be of unequal size.

Also shown is a driven gear 30 which also has 24 teeth. Gear 30 is mounted on a shaft 30 and prevented from slipping with respect to shaft 32 by a key 34. When the two gears are engaged and rotating, they provide a 1:1 ratio. Meshing teeth are to be of the same pressure angle. Thus, gear 30 is provided with three sectors 40, 42, and 44, which have first, second, and third pressure angles, respectively. When gear 10 rotates counterclockwise and is enmeshed with gear 30, gear 30 rotates clockwise.

The teeth in gears 10 and 30 in FIG. 1 have varying pressure angle. However, such detail is not visible. In FIG. 2, a detail of a gear tooth 200 is shown that has a pitch circle 202. Tooth 200 has a first side 210 and a second side 220. Lines 212 and 222 are radii of the gear (not shown) associated with tooth 200. Lines 216 and 226 are tangents of pitch circle 202 at their respective pitch points. (The pitch point is on the surface of first side 210 where lines 214, 216, and pitch circle 202 intersect. The other pitch point is on the surface of second side 220 where lines 224, 226, and pitch circle 202 intersect.) Line 214 is perpendicular to the tangent (not shown for clarity purposes) of side 210 that travels through its associated pitch point. Similarly, 224 is perpendicular to the tangent (also not shown) of side 220 that travels through its associated pitch point. The pressure angle for side 210 is defined by angle 218 and the pressure angle for side 220 is defined by angle 228. The pressure angles on the two sides of the teeth may differ. Typical pressure angles in gears are in a non-limiting range of 15-25 degrees.

During rotation, each gear tooth contacts two teeth from the mating gear. Referring back to FIG. 1, all eight teeth in sector 20 have the same pressure angle on each side of the teeth. However, a tooth 46 on gear 30 is a transition tooth with half of the tooth in sector 40 and half of the tooth being in sector 42. Tooth 46 has the pressure angle associated with the sector in which it is located, i.e., the half in sector 40 has a first pressure angle and the half in sector 42 has a second pressure angle. Tooth 46 is a transition tooth that makes the transition from meshing sectors 20 with 40 to meshing sectors 22 with 42 proceed smoothly. For every change in pressure angle around the periphery of one gear, one tooth on a mating pair of gears has a transition tooth, which is defined herein as having one pressure angle on one side of the tooth and a different pressure angle on the other side of the tooth.

The present disclosure can be applied to other than 1:1 ratio gears. In FIG. 3, a first gear 10, has three sectors 20, 22, and 24 that have first, second, and third pressure angles, respectively. A second gear 50 that has teeth enmeshed with teeth of first gear 10 has double the number of teeth as first gear 10, that is, 48 teeth. Gear 50 is mounted on shaft 52 by a key 54 that engages with keyways formed in both shaft 52 and gear 50. When gear 10 rotates counterclockwise twice, gear 50 rotates once. In such a period, the teeth in sector 20 of gear 10 enmesh twice with teeth on gear 50. Thus, gear 50 has two sectors, 60, which are diametrically opposed and have the first pressure angle. Teeth of two diametrically-opposed sectors 62 are formed with the second pressure angle. Teeth of two diametrically-opposed sectors 64 are formed with the third pressure angle. As described above, in other embodiments, sectors 20, 22, and 24 of gear 10 need not all be identical in size. However, the number of teeth in sector 20 is the same as the number of teeth in both of sectors 60. Teeth numbers in sectors 22 and 62 are identical. And, a similar correspondence occurs in sectors 24 and 64.

The present disclosure can be applied to any pair of driving/driven gears in which the ratio involves integers: 1:2; 3:1, 1:4, as examples. The teeth that mesh should be of the same pressure angle. For this to happen, there is a transition tooth between sections of different pressure angles on one of the two meshing gears. Gears in which different teeth mesh during each revolution, do not benefit from the present disclosure.

A 12-toothed gear 70 is shown in FIG. 4 in which the pressure angle is changed for each tooth. Teeth 80, 80', 80", and 80''' have a first pressure angle. Teeth 82, 82', 82" and 82''' have a second pressure angle. Teeth 84, 84', 84", and 84''' have a third pressure angle. All teeth of a gear that meshes with gear 70 are transition teeth: a tooth having the first pressure angle on one side and the second pressure angle on the other side followed by a tooth having the second pressure angle on one side and the third pressure angle on the other side followed by a tooth having the third pressure angle on the one side and the first pressure angle on the other side, in succession. Other regular patterns may alternatively be employed as well as different numbers of teeth. In other alternatives, two pressure angles are used in a regular pattern, or more than three, as is shown in the example in FIG. 4.

Gear 70 in FIG. 4 is not shown mounted on a shaft and the opening 72 to accommodate a shaft as well as a keyway 74 formed in the gear to accept a key are shown.

Figure 5:
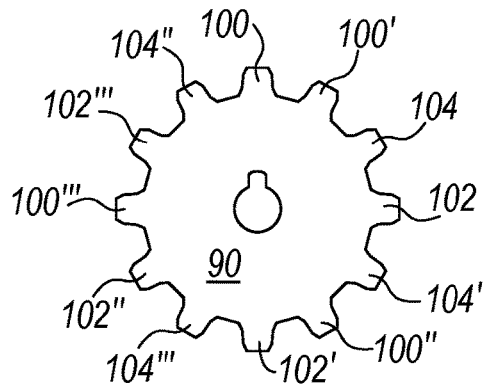

Shown in FIG. 5 is a 12-toothed gear 90 having teeth of three pressure angles, but the arrangement is random. Teeth 100, 100', 100", and 100''' all have the same pressure angle. It turns out that 100 and 100' are adjacent to each other simply due to the random nature.

Figure 6:
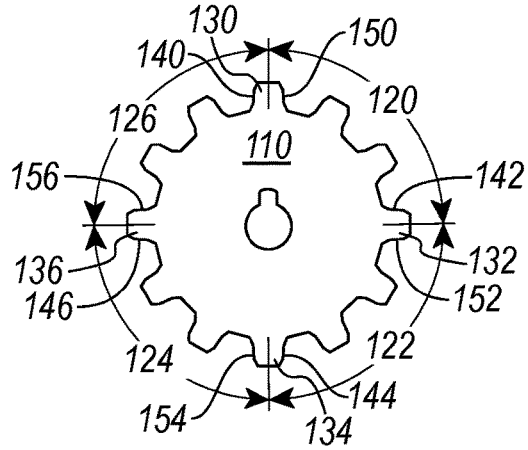
Figure 7:
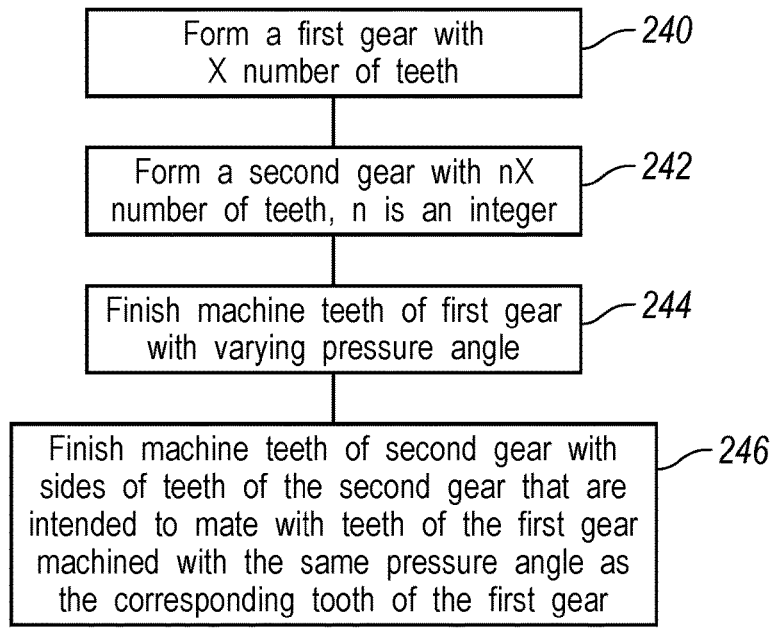
FIG. 7 is a process by which gears can be fabricated.

In FIG. 6, a 12-toothed gear is shown having four sectors: 120, 122, 124, and 126, each having a pressure angle assigned to the teeth within its sector. Transition teeth 130, 132, 134, and 136 have two pressure angles, e.g., a side 150 of tooth 130 and a side 142 of tooth 132 have the pressure angle associated with sector 120. Analogously, side 152 and 144 have the pressure angle associated with sector 122; side 154 and 146 have the pressure angle associated with sector 124; side 156 and 140 have the pressure angle associated with sector 126. A gear that mates with gear 110, if it were a 1:1 ratio, would also have 12 teeth, three each have pressure angles associated with sectors 120, 122, 124, and 126 on both sides of the teeth. Sectors 120 and 124 may have the same pressure angle that is different than 124 and 126.

While the best mode has been described in detail with respect to particular embodiments, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments described herein that are characterized as less desirable than other embodiments or prior art implementations with respect to one or more characteristics are not outside the scope of the disclosure and may be desirable for particular applications.

We claim:

1. A gear set, comprising:
a first gear having a first portion of teeth having a first pressure angle and a second portion of teeth having a second pressure angle;
a second gear having a first portion of teeth having the first pressure angle and a second portion of teeth having the second pressure angle;
a third portion of teeth on the first gear having a third pressure angle; and
a third portion of teeth on the second gear having the third pressure angle,
wherein the first portion of the first gear teeth mesh with the first portion of the second gear teeth during operation; the first pressure angle does not equal the second pressure angle; the first portion of teeth of the first gear are dissimilar from the second portion of teeth of the first gear; the first portion of teeth of the second gear are dissimilar from the second portion of teeth of the second gear; the first pressure angle does not equal the third pressure angle; and the second pressure angle does not equal the third pressure angle.

2. The gear set of claim 1 wherein:
total number of teeth on the first gear equals total number of teeth on the second gear;
a number of teeth in the first portion of teeth of the first gear is one greater than number of teeth in the first portion of the second gear; and
the second gear has a transition tooth in which the pressure angle on a first side of the tooth is the first pressure angle and the pressure angle on a second side of the tooth is the second pressure angle.

3. The gear set of claim 1 wherein:
total number of teeth on the first gear divided by total number of teeth on the second gear yields a quotient of one of: two, three, four, five, one-half, one-third, one-quarter, and one-fifth;
number of teeth in the first portion of the first gear equals the quotient times the number of teeth of the second gear;
when the quotient is greater than one, the first portion of teeth on the first gear is separated into evenly-spaced regions with the number of regions equal to the quotient; and
when the quotient is less than one, the first portion of teeth on the second gear is separated into evenly-spaced regions with the number of regions equal to the reciprocal of the quotient.

4. The gear set of claim 3 wherein:
when the quotient is greater than one, the first portion of teeth on the second gear are mutually adjacent; and
when the quotient is less than one, the first portion of teeth on the first gear are mutually adjacent.

5. The gear set of claim 1, further comprising:
a first shaft;
a second shaft arranged in parallel with the first shaft;
a first index on the first gear; and
a second index on the second gear wherein:
the first gear is mounted on the first shaft;
the second gear is mounted on the second shaft; and
the first and second index are lined up when the driving and second gears are enmeshed.

6. The gear set of claim 1 wherein the teeth of the first gear are evenly spaced on a periphery of the first gear; and the teeth of the second gear are evenly space on a periphery of the second gear.

7. The gear set of claim 1 wherein:
the first portion of teeth of the first gear is mutually exclusive from the second portion of teeth of the first gear.

8. The gear set of claim 1 wherein:
the first portion of teeth in the first gear is located in a first sector of the first gear;
the second portion of teeth in the first gear is located in a second sector of the second gear; and
the first and second sectors are identical in size.

9. A gear set, comprising:
a first gear in which teeth in a first sector have a first pressure angle and teeth in a second sector have a second pressure angle; and
a second gear in which teeth in a third sector have the first pressure angle and teeth in a fourth sector have the second pressure angle wherein the first and second gears are enmeshed; a tooth in the first sector adjacent to a tooth in the second sector are different.

10. The gear set of claim 9 wherein:
the first gear further comprises a fifth sector in which the teeth have a third pressure angle;
the second gear further comprise a sixth sector in which the teeth have the third pressure angle;
the first pressure angle is different from the second and third pressure angles; and
the second pressure angle is different from the third pressure angle.

11. The gear set of claim 10 wherein the teeth of the first gear and the second gear that sit on an overlap between the two sectors are transition teeth in which the pressure angle on one side of the tooth differs from the pressure angle on the other side of the tooth.

12. The gear set of claim 9 wherein:
a number of whole teeth in the first sector of the first gear is within one of a number of whole teeth in the third sector of the second gear.

13. The gear set of claim 9 wherein:
the second gear further comprises a fifth sector in which the teeth have the first pressure angle;
the second gear further comprises a sixth sector in which the teeth have the second pressure angle;
the fifth sector is located between the third and fourth sectors; and
when the gears rotate, the teeth of the first sector mesh with the teeth of the third and fifth sectors; and the teeth of the second sector mesh with the teeth of the fourth and sixth sectors.

14. The gear set of claim 9, further comprising:
a first shaft;
a second shaft arranged in parallel with the first shaft wherein:
the first shaft is inserted into a centrally-defined opening on the first gear; and
the second shaft is inserted into a centrally-defined opening on the second gear.

15. The gear set of claim 14 wherein:
the first shaft, the second shaft, the centrally-defined opening on the first gear, and the centrally-defined opening on the second gear each have a keyway defined therein, the gear set further comprising:
a first key inserted into the keyways of the first shaft and the keyway on the first gear; and
a second key inserted into the keyways of the second shaft the keyway on the second gear.

16. The gear set of claim 9 wherein:
teeth of the first gear are evenly spaced on the periphery of the first gear; and
teeth of the second gear are evenly spaced on the periphery of the second gear.

17. The gear set of claim 9 wherein:
teeth of the first portion of teeth of the first gear are substantially identical;
teeth of the second portion of teeth of the first gear are substantially identical; and
teeth of the first portion of teeth of the first gear and teeth of the second portion of teeth of the second gear are different.

18. The gear set of claim 9 wherein:
the first gear is indexed to the second gear; and
a first tooth of the first gear always meshes with a first tooth of the second gear during rotation of the first and second gears.

* * * * *